US012682240B1

(12) United States Patent
Gao et al.

(10) Patent No.: US 12,682,240 B1
(45) Date of Patent: Jul. 14, 2026

(54) VARIANCE AWARE TECHNIQUES TO PRUNE NEURAL NETWORKS

(71) Applicant: NVIDIA Corporation, Santa Clara, CA (US)

(72) Inventors: Shuang Gao, Newark, CA (US); Xin Liu, Pleasanton, CA (US); John Zedlewski, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 637 days.

(21) Appl. No.: 16/401,058

(22) Filed: May 1, 2019

(51) Int. Cl.
    *G06N 3/082*     (2023.01)
    *G06N 3/04*     (2023.01)
    *G06V 30/18*     (2022.01)

(52) U.S. Cl.
    CPC .............. *G06N 3/082* (2013.01); *G06N 3/04* (2013.01); *G06V 30/18057* (2022.01)

(58) Field of Classification Search
    CPC ..... G06N 3/082; G06N 3/04; G06V 30/18057
    See application file for complete search history.

(56) References Cited

U.S. PATENT DOCUMENTS

| | | | | |
|---|---|---|---|---|
| 2018/0260695 | A1* | 9/2018 | Majumdar | ............... G06N 3/08 |
| 2018/0336431 | A1* | 11/2018 | Kadav | ...................... G06N 3/04 |
| 2019/0050653 | A1* | 2/2019 | Natroshvili | .......... G06N 3/0454 |

OTHER PUBLICATIONS

Alvarez et al., "Learning the No. of Neurons in Deep Networks," Advances in Neural Information Processing Systems 29, Oct. 11, 2018, pp. 2270-2278.

Dong et al., "More is Less: A More Complicated Network with Less Inference Complexity," The IEEE Conference on Computer Vision and Pattern Recognition (CVPR), May 15, 2017, 9 pages.

Gordon et al., "Morphnet: Fast and Simple Resourceconstrained Structure Learning of Deep Networks," In The EEE Conference on Computer Vision and Pattern Recognition (CVPR), Jun. 2018, 10 pages.

Han et al., "Learning Both Weights and Connections for Efficient Neural Networks," In Proceedings of the 28th International Conference on Neural Information Processing Systems—vol. 1, Oct. 30, 2015, pp. 1135-1143.

Hassibi et al., "Optimal Brain Surgeon and General Network Pruning," IEEE International Conference on Neural Networks, vol. 1, Mar. 1993, pp. 293-299.

He et al., "Channel Pruning for Accelerating Very Deep Neural Networks," IEEE International Conference on Computer Vision (ICCV), Aug. 21, 2017, 10 pages.

He et al., "Deep residual learning for image recognition," Proceedings of the IEEE Conference on Computer Vision and Pattern Recognition, Jun. 26, 2016, 9 pages.

Huang et al., "Densely Connected Convolutional Networks," IEEE Conference on Computer Vision and Pattern Recognition (CVPR), Jul. 2017, 9 pages.

(Continued)

*Primary Examiner* — Jianxun Yang

(74) *Attorney, Agent, or Firm* — Davis Wright Tremaine LLP

(57)     ABSTRACT

Systems and methods to use weight information corresponding to a neural network, wherein weight information of at least a first one or more layers of the neural network is (Continued)

500

Group Filters From Across Two Or More Layers Of A Neural Network — 502

Perform A Regularization On The Group To Enforce Aligned Structure Sparsity — 504

Filter Group Removable? — 506

Keep Filters — 510

Remove Filters — 508 modified to compensate for deactivating one or more second layers of the neural network. The neural network may be a residual neural network.

46 Claims, 12 Drawing Sheets

(56) References Cited

OTHER PUBLICATIONS

Jandola et al., "Squeezenet: AlexNet-Level Accuracy with 50× Fewer Parameters and <0.5mb Model Size," arXiv, Nov. 4, 2016, 13 pages.

IEEE, "IEEE Standard 754-2008 (Revision of IEEE Standard 754-1985): IEEE Standard for Floating-Point Arithmetic," Aug. 29, 2008, 70 pages.

Li et al., Pruning Filters for Efficient ConvNets, Sep. 15, 2016, 9 pages.

Luo et al., "Thinet: A Filter Level Pruning Method for Deep Neural Network Compression," IEEE International Conference on Computer Vision (ICCV), Oct. 2017, 9 pages.

Scardapane et al., "Group Sparse Regularization for Deep Neural Networks," Neurocomput, 241(C), Jul. 2, 2016, 10 pages.

Tung et al., "Clip-Q: Deep Network Compression Learning by In-Parallel Pruning-Quantization," IEEE Conference on Computer Vision and Pattern Recognition, Jun. 2018, 10 pages.

Wen et al., "Learning Structured Sparsity in Deep Neural Networks," Advances in Neural Information Processing Systems 29, Oct. 18, 2016, pp. 2074-2082.

Ye et al., "Rethinking the Smaller-Norm-Less-Informative Assumption in Channel Pruning of Convolution Layers," Feb. 2, 2018, 11 pages.

Yu et al., "NISP: Pruning Networks using Neuron Importance Score Propagation," IEEE Conference on Computer Vision and Pattern Recognition, Jun. 2018, 10 pages.

Yuan et al., "Model Selection and Estimation in Regression with Grouped Variables," Journal of the Royal Statistical Society, Series B, 68, 2006, pp. 49-67.

Huang et al., "Data-Driven Sparse Structure Selection for Deep Neural Networks," Dec. 18, 2017, 9 Pages.

He et al., "Soft Filter Pruning for Accelerating Deep Convolutional Neural Networks," 2018, 8 pages.

* cited by examiner

100

L1
302

300

Group
Lasso
304

VACL
306

Contour
Lines

Higher
Regularization
Loss

400

```
while stage_idx < stage_num
    if stage_idx % 2 == 0
        apply L1 regularization on all layers and train;
    else
        apply VACL regularization on single layers and train;
    end
    prune the model;
    if accuracy and pruned_ratio meet expectation or
accuracy << expectation
        break;
    end
end
```

⌐ 402

```
while stage_idx < stage_num
    if stage_idx % 2 == 0
        apply L1 regularization on all layers and train;
    else
        apply VACL regularization on single layers and train;
    end
    prune the model;
    if accuracy and pruned_ratio meet expectation or
accuracy << expectation
        break;
    end
end
```

To/From
Xbar

Memory Partition Unit
900

Raster Operations Unit
902

L2 Cache
904

To/From
Xbar

Memory Interface
906

To/From
Memory

VARIANCE AWARE TECHNIQUES TO PRUNE NEURAL NETWORKS

BACKGROUND

In the context of deep learning and neural networks, larger networks are typically generated to achieve greater accuracy. However, there are often many parameters, filters, and layers in a neural network that make it computationally expensive to run the neural network at inference time. Various pruning techniques have been attempted to reduce the overall complexity of a neural network without affecting or without substantially affecting quality of the neural network. However, there are many challenges surrounding the use of pruning techniques. For example, a non-structured pruning method that removes parameters individually may result in sparse layers which cannot be easily removed and rely on fast sparse matrix multiplication implementations to improve performance. Structured methods for removing parameters in units of neurons, filters, channels, layers, etc., may be challenging to implement based on the layout of a neural network and it may be the case that in order to effectively remove a channel from a layer, that other channels from other related channels must also be removed. One existing strategy for pruning neural networks is improving weights sparsity. However, most existing methods use regularizations that only consider structural sparsity within an individual layer. Accordingly, there are challenges surrounding the removal of groups of layers without loss of impact to the quality of predictions generated by the neural network.

BRIEF DESCRIPTION OF THE DRAWINGS

Various techniques will be described with reference to the drawings, in which:

FIG. 4 illustrates a system in which an iterative training and pruning pipeline is implemented, in accordance with one embodiment;

DETAILED DESCRIPTION

In an embodiment, techniques described herein are utilized to improve the runtime efficiency of a neural network by removing parameters from the neural network without affecting or without substantially affecting the accuracy of the neural network. In an embodiment, techniques described herein align filters (e.g., a group of weights that correspond to one output feature map) sparsity across layers that are related to one another. In an embodiment, filters that are related to one another are referred to as common filters and are simultaneously removed from the neural network during pruning to reduce computational and parameter storage constraints on computer systems that utilize the neural network.

In an embodiment, common filters refer to a group of filters that are to be simultaneously removed from a neural network during pruning. In an embodiment, a common filter is common to a set of two or more layers and the common filter, if removed from one layer of the set, is to be removed from other layers of the set. In an embodiment, layers of a neural network are grouped into sets based on the architecture of the neural network. In an embodiment, filters are related to each other group element-wise operations such that the i-th filter of the layers are put into one regularization group and a constraint is imposed so that the i-th filter of each layer will either stay or be removed simultaneously during pruning.

Figure 1:
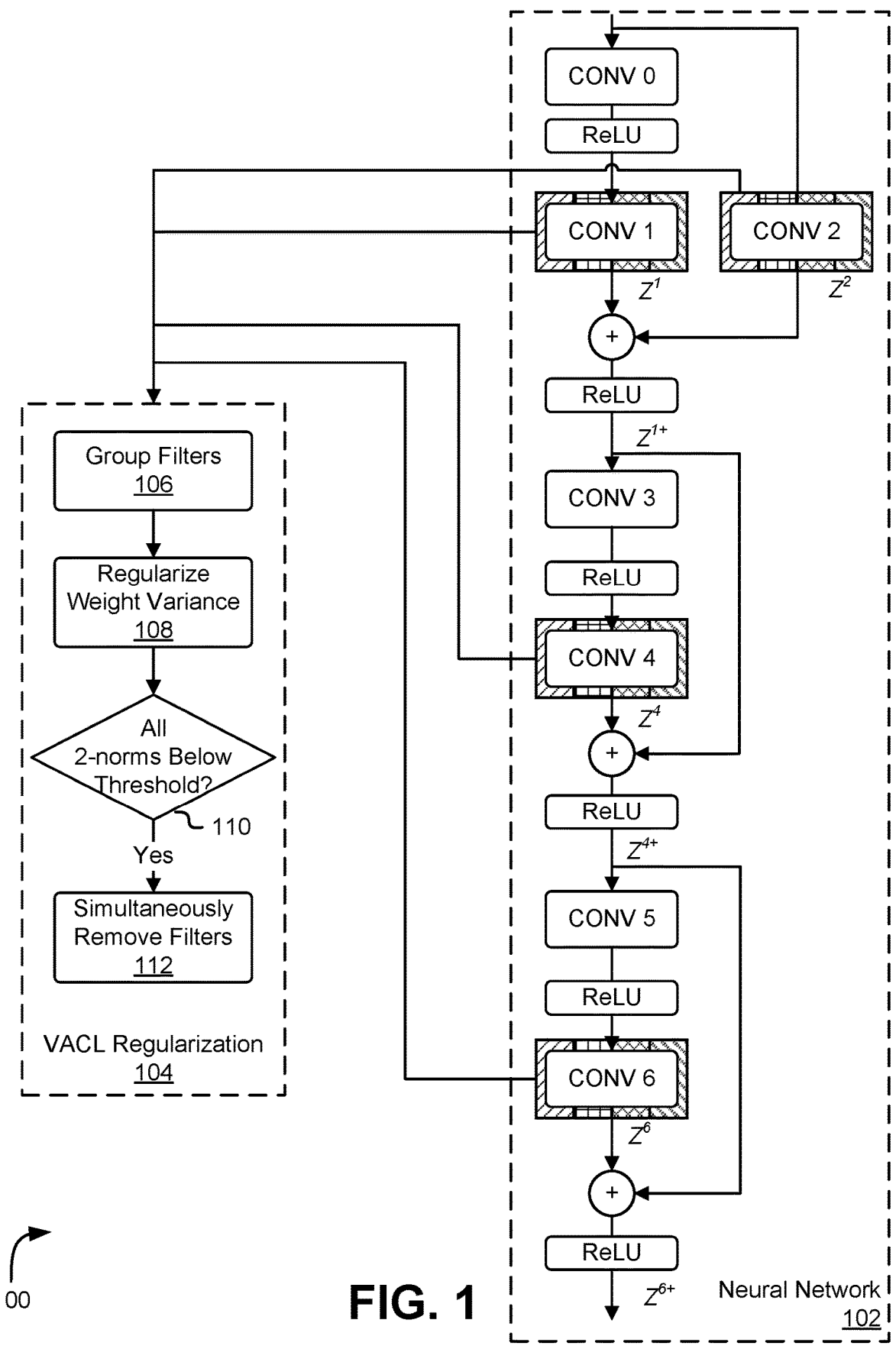
FIG. 1 illustrates a system to implement variance aware cross layer regularization, in accordance with one embodiment.

In an embodiment, FIG. 1 illustrates a system 100 to implement neural network pruning, in accordance with one embodiment. In an embodiment, the system 100 illustrates a variance aware cross layer (VACL) regularization for residual network pruning. As described herein, a residual network may alternatively be referred to as a residual neural network. In an embodiment, techniques described herein are used in a training-pruning pipeline to achieve improved pruning efficiency without loss of accuracy or with substantially no loss of accuracy. In an embodiment, a VACL regularization method for residual networks reduces variance of parameters in a group to encourage aligned sparsity in a stable manner. In an embodiment, the system uses a hybrid regularization method in a training-pruning pipeline (e.g., VACL combined with a regularizer) to alternatively improve sparsity of different model component and achieve better overall pruning ratio.

In an embodiment, FIG. 1 illustrates a portion of a neural network 102. In an embodiment, the neural network is a residual network with skip-connections. In an embodiment, the neural network is a deep residual network. In an embodiment, a residual neural network—also referred to as a "residual network" elsewhere in this disclosure—is an artificial neural network that utilizes skip-connections to jump over layers in the network. In an embodiment, an additional weight matrix is used to learn the skip weights. In an embodiment, residual networks are utilized to solve the problem of vanishing gradients by reusing activations from a previous layer and is utilized to simply a network and/or improve the learning speed of the network during training. In an embodiment, a system (e.g., the same system as or a different system from the pruning system) trains a neural network to adjust the weights and filters of a neural network. In an embodiment, the neural network is a convolutional neural network trained on a set of inputs to predict a set of outputs using a set of hidden layers that generate intermediate outputs that are used as inputs to other hidden layers which, upon execution, generates a prediction or output.

Figure 5:
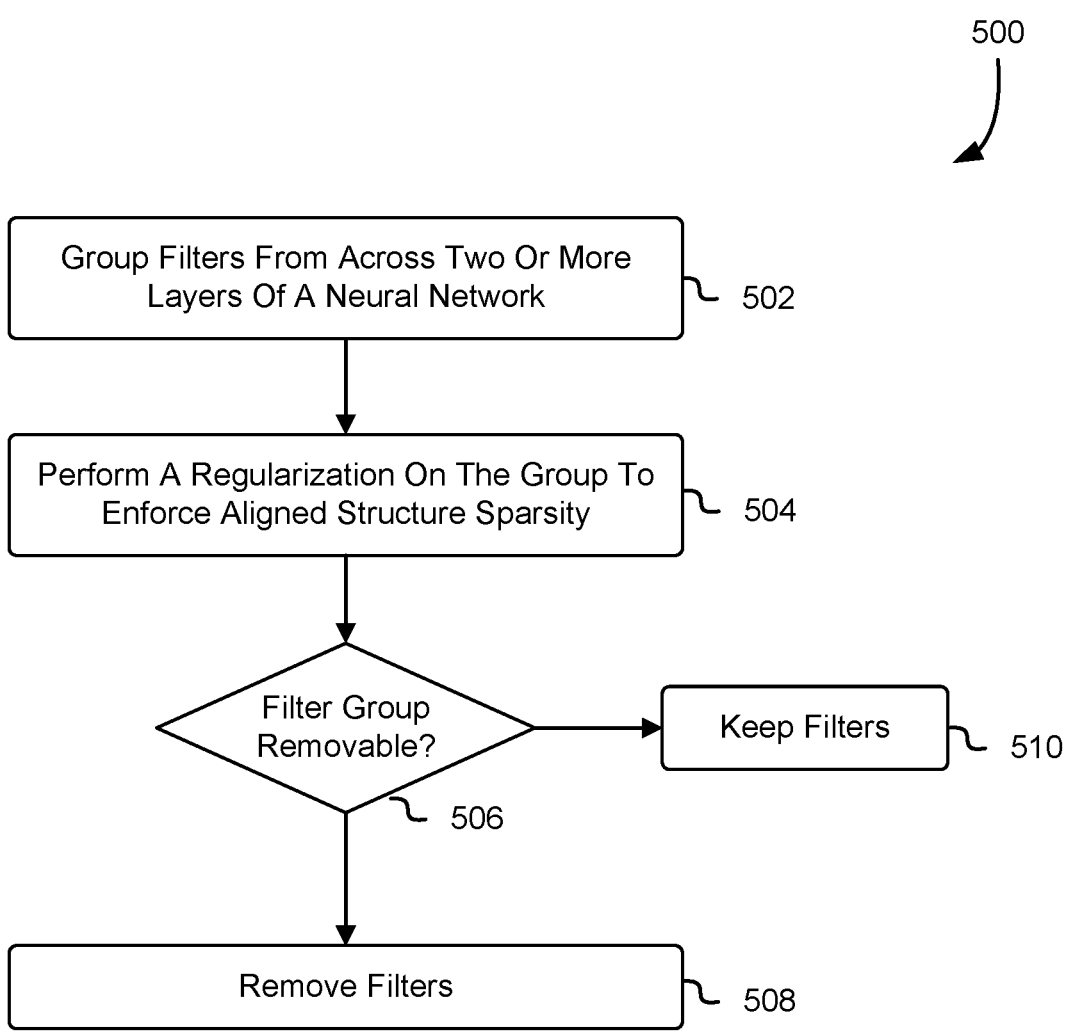
FIG. 5 shows an illustrative example of a process to prune a neural network using techniques described here, in accordance with an embodiment.

In an embodiment, given W the weights, $Z^l$ the output of the l-th layer. $Z^l = F^l(W^l, \sigma Z^{l-1})$ where $\sigma$ is the rectified linear unit (ReLU) function, and $Z^{l-1}$ the output of the (l-1)-th layer for layers that are not connected by skip connections, and $Zl^+ = \sigma(Z^{(l-2)+} + Z^l)$ for the output after the element-wise addition operation. Accordingly, in an embodiment, the output of the portion of the neural network (e.g., a ResNet block) illustrated in FIG. 5 is represented as:

$$Z^{6+} = \sigma(Z^6 + Z^{4+})$$

$$Z^{4+} = \sigma(Z^4 + Z^{1+})$$

$$Z^{1+} = \sigma(Z^1 + Z^2)$$

In an embodiment, given X the mini-batch of N samples $(x_n, y_n)$, with $x_n$ the network input, $y_n$ the ground-truth, the loss function is $$\mathcal{L}(X, W) = \sum_{n=1}^{N} E[y_n, \mathcal{F}(x_n, W)] + \lambda R$$

with E the prediction loss, R the regularization loss, W the weights, and $\lambda$ the regularization weight. In an embodiment, regularizations used include L1 and L2. In an embodiment, group lasso is a variation which is used to improve sparsity within a layer. In an embodiment, given $w_g$ denoting a group of weights, and G a set of weight groups, a group lasso is defined as: $R^G = \sum_{g \in G} \sqrt{p_g} \cdot \|w_g\|_2$ with $p_g$ the weight number in $w_g$ where it firstly calculates the 2-norm for weights in each group, and the gets the weighted summary overall all groups cross all layers. In an embodiment, a 2-norm (also referred to as a L2 norm) of a vector is calculated as the square root of the sum of the squared vector values.

In an embodiment, a computer system applies a variance aware cross layer (VACL) regularization 104 to a neural network or portion thereof based on group lasso regularization to efficiently enforce aligned structure sparsity across layers connected by skip-connections. In an embodiment, connected layers are sparsity aligned and weights can be efficiently removed from each of those layers. In an embodiment, each group illustrated in FIG. 1 (as indicated by the four different patterns) include 4 kernels (or filters) each from a different layer, when these filters fulfill pruning criteria simultaneously, they can be removed, otherwise all of them need to remain in the model. In an embodiment, FIG. 1 illustrates a VACL regularization for the group of filters represented by the right-to-left upwards diagonal pattern.

In an embodiment, variance aware cross layer (VACL) regularization re-organizes weights from multiple convolutional layers into a set of cross-layer weight groups. In an embodiment, each weight group includes a portion of weights from all grouped layers. In an embodiment, the i-th filter from all layers within a weight group are grouped together 106, the purpose being to enforce weights from the i-th filter of all layers to be simultaneously small or large, so that all these layers have align the sparsity pattern across filters. In an embodiment, for convolutional layers that are directly connected by element-wise operations, their i-th filters are grouped into a cross-layer weight group g and when weights in these filters become simultaneously small enough to meet the pruning criteria, they are removed and the size of each related layer is reduced.

In an embodiment, $$R^{vacl} = \sum_{g \in G} R_g^{vacl}$$

defines a VACL regularization and is represented in expanded form as:

$$R^{vacl} = \sum_{g \in G} \sum_{k=1}^{K} \sqrt{p_k^g} \left[ \|w_k^g\|_2 + \left\| \left( |w_k^g| - \overline{|w_k^g|} \right) \right\|_2 \right]$$

where the weights of the $k^{th}$ filter in layer group g are denoted as $$w_k g.$$

In an embodiment, $$p_k^g$$

refers to the weight number of the k-th filter in layer group g. In an embodiment, the first term of the VACL regularization calculates 2-norm of $$w_k g,$$

and then calculates the 2-norm of weights absolute difference of $$w_k g.$$

In an embodiment, the total cost of the model, as shown in the loss function $\mathcal{L}(X, W)$ described above is extended as:

$$\mathcal{L}(X, W) = \sum_{n=1}^{N} E[y_n, \mathcal{F}(x_n, W)] + \lambda R^{vacl}$$

$$= \sum_{n=1}^{N} E[y_n, \mathcal{F}(x_n, W)]$$

$$+ \lambda \left( \sum_{g \in G} \left\{ \sum_{k=1}^{K} \sqrt{p_k^g} \left[ \|w_k^g\|_2 \right. \right. \right.$$

$$\left. \left. \left. + \left\| \left( |w_k^g| - \overline{|w_k^g|} \right) \right\|_2 \right] \right\} \right)$$

In an embodiment, VACL regularization has an item that regularizes weight variance inside each group 108. In an embodiment, a layer group includes multiple convolutional layers (e.g., 18 layers) connected by skip-connections according to a neural network (e.g., ResNet 110) and the layer group also includes, if needed, a convolutional layer for dimension projection (e.g., where input and output dimensions are different). In an embodiment, there can be various number of layers in a layer group (e.g., ResNet 110 is organized into 3 layer groups each having either 18 or 19 connected layers). In an embodiment when group lasso which uses 2-norm of groups is applied, one possibility is: the overall regularization loss is small, but the variance of the 2-norm of weights in one group is large-which can arise in cases where the i-th filter of at least one convolutional layer is large (e.g., in 17 of the 18 layers, the i-th filter of one convolutional layer have weights small enough to fulfill the pruning criteria but the i-th filter of one convolutional layer does not). In an embodiment, the system checks whether 110 all 2-norms satisfy the pruning criteria (e.g., all 2-norm values are below a threshold value) and as a result of even a single filter failing to satisfy the pruning criteria, the i-th filter of all 18 layers cannot be removed. However, in an embodiment, if all 2-norms satisfy the pruning criteria the grouped filter from all layers can be simultaneously removed.

In an embodiment, VACL regularization penalizes variance within a group (e.g., variance of the i-th filter between layers) to encourage each group to not only have small group lasso cost, but also reduces the variance of weights within a group and in turn efficiently align the sparsity of all connected layers. In an embodiment, for a group comprising the i-th filter of two or more convolutional layers, group lasso cost is minimized or reduced and variance of weights within the group is also reduced to reduce overall weights within the group to zero or substantially near zero, allowing the i-th filter of each layer to be simultaneously removed 112. It should be noted that simultaneous removal refers to the atomic nature of the removal of the multiple filters as being an all-or-nothing operation (e.g., removal of some but not all of the filters in a group is disallowed) and not necessarily that the filters are temporally removed at the same time.

In an embodiment, the neural network illustrated in FIG. 1 is implemented based on or using a ResNet architecture. In an embodiment, the neural network is trained to solve one or more problems in computer vision including but not limited to: object detection; image classification; feature detection; and more. In an embodiment, a neural network is trained on an image collection to perform a computer vision related task (e.g., boundary detection) and a trained model is produced from the training process with a set of weights, filters, and layers to generate predictions at inference time. In an embodiment, the trained neural network is pruned to reduce the computational complexity of the neural network by re-organizing weights, filters, layers, etc. to reduce the computational complexity of running the neural network at inference time. In an embodiment, the neural network is pruned to remove one or more filters or layers from the neural network using VACL regularization to produce a pruned neural network without substantially affecting the accuracy of the (un-pruned) trained neural network. In an embodiment, accuracy or quality of the neural network not being substantially affected is determined by testing the accuracy of an un-pruned neural network against a training data set to determine a baseline accuracy or quality metric and then running pruned neural network on the same training data set to determine the accuracy or quality metrics for the pruned neural network; the observed metrics are compared, and if the accuracy of the pruned neural network is inferior to that of the original network or has decrease in metrics that exceeds a threshold value, then the pruning may be said to have substantially affected the quality of the neural network and, in an embodiment, the pruned neural network is rejected and another re-organization of the weights is to be attempted.

In an embodiment, VACL is defined as an extension of Group Lasso which constrains the variance of weights in a weight group in addition to constraining the 2-norm of the layer groups. In an embodiment, VACL efficiently enforces aligned structured sparsity in one layer group L. In an embodiment, a model has multiple layer groups and G denotes the set of all layer groups in a model where $L_g$ denotes the g-th layer group. In an embodiment, VACL regularization is defined as:

$$R_{VACL} = \sum_{g \in G} \sum_{i=1}^{M} \sqrt{p_i^g} [r_{2norm} + r_{var}] \text{ with } r_{2norm} =$$
$$\|W_i^g\|_2 \text{ and } r_{var} = \left\| \left( |W_i^g| - |\overline{W_i^g}| \cdot 1 \right) \right\|_2.$$

In an embodiment, the weights of the i-th filter in layer group $L_g$ are denoted as $$W_i^g,$$

the first term in the inner summand is the 2-norm of $$W_i^g,$$

the second term is the 2-norm of weights absolute difference $$|W_i^g| - |\overline{W_i^g}| \cdot 1$$

where $$|\overline{W_i^g}|$$

is the mean of $$|W_i^g|,$$

and 1 is a vector filled with ones. In an embodiment, it sums results over all M filters to obtain the regularization loss for the layer group $L_g$ and sums up over all layer groups in G. In an embodiment, $r_{2norm}$ is the 2-norm inherited from Group Lasso and the term $r_{var}$ is a constraint to reduce the variance of the absolute values of the weights in $W_i$. In an embodiment, the contours of VACL are in accordance with those discussed in connection with FIG. 3, having contours with four sharp corners in two diagonal directions to constrain the weights' absolute values.

In an embodiment, the total loss of the model is described as:

$$\mathcal{L}(X, W) = \sum_{n=1}^{N} E[y_n, \mathcal{F}(x_n, W)] + \lambda_1 R^{VACL}(W_g) + \lambda_2 R^{GL}(W_s)$$

with $R^{VACL}$ the VACL constraint applied to all layer groups, and $R^{GL}$ the Group Lasso applied to other layers that are not connected by element-wise operators (e.g., element-wise addition), $\lambda_1$ and $\lambda_2$ are regularization weights for $R^{VACL}$ and $R^{GL}$ respectively, $W_g$ denotes the weights in the layer groups, and $W_s$ denotes the weights in other layers. In an embodiment, the four convolutional layers bolded in FIG. 1 are constrained by $R^{VACL}$ and the three convolutional layers not in bold are constrained by $R^{GL}$ by defining one filter as a weight group.

Figure 2:
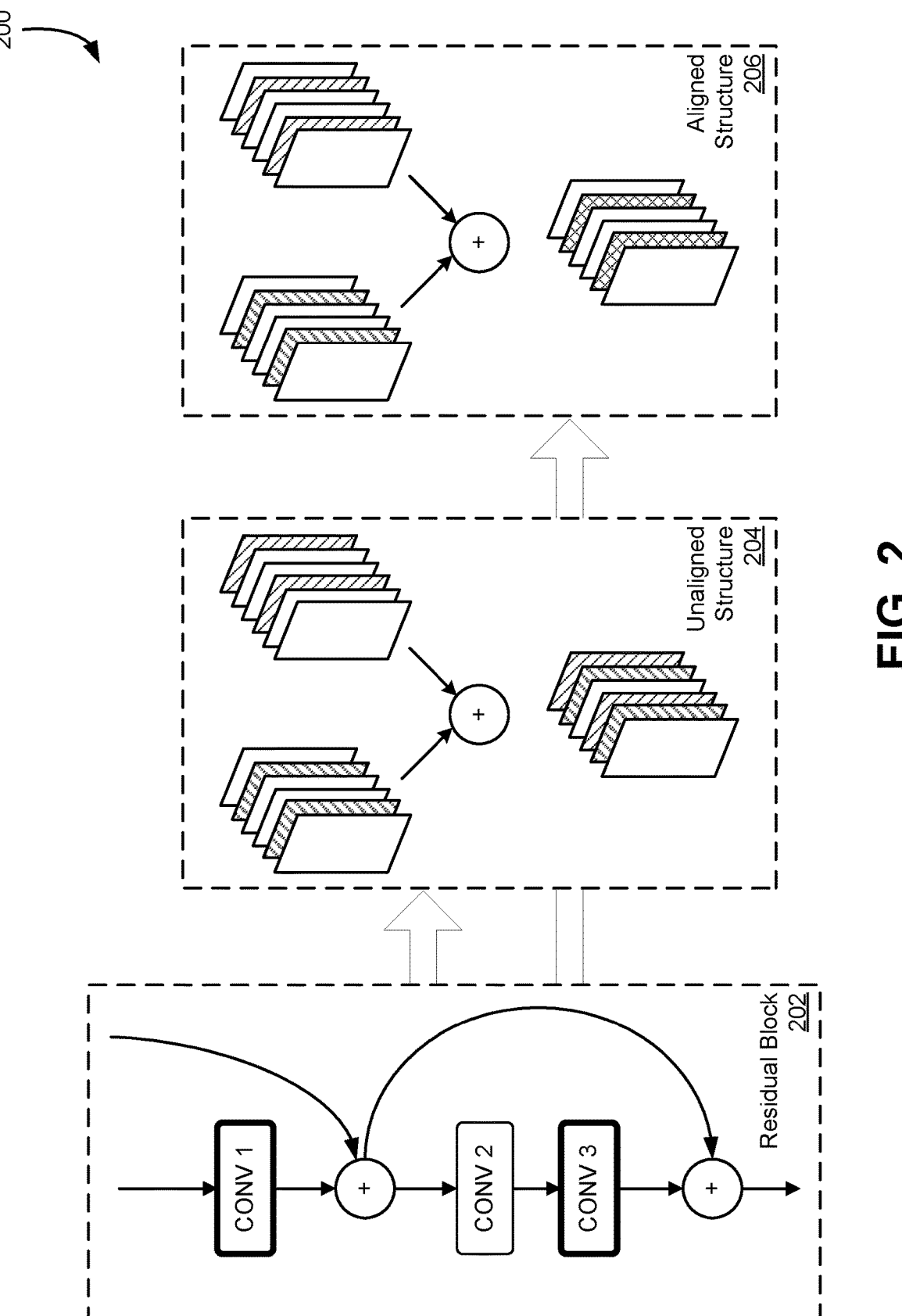
FIG. 2 illustrates a system in which aligned structure sparsity across layers, is discussed in accordance with one embodiment.

In an embodiment, FIG. 2 illustrates a system 200 in which various embodiments are implemented in accordance with one embodiment. In an embodiment, FIG. 2 illustrates a portion of a neural network 202 and two different aligned sparsities. In an embodiment, FIG. 2 illustrates a portion of a neural network 202. In an embodiment, FIG. 2 depicts an example residual block in accordance with one or more versions of ResNet (e.g., ResNet 110). In an embodiment, a traditional network has each layer feed into the next layer, whereas in a network, a layer feeds into the next layer and also directly into later layers (e.g., multiple hops away). In an embodiment, skip-connections—also referred to as residual connections—are used to skip training of interme- diate hidden layers. In an embodiment, the skip connections are used so that during training, the neural network can either train the layer in residual blocks or skip the training for those layers using skip connections. In an embodiment, the skip connections are used to solve problems related to vanishing gradients.

In an embodiment, FIG. 2 illustrates a neural network with two common layers, in bold (e.g., CONV 1 and CONV 3), in which the removal of a filter in one layer necessitates the removal of a corresponding filter in another layer. In an embodiment, for layers that are related to each other through element-wise operation, the i-th filter of the layers are grouped together and either kept or removed simultaneously during pruning. In an embodiment, the output shape of the layers in a group are to have the same dimensions.

FIG. 2 illustrates, in an embodiment, a first architecture 204 having different structured sparsity. In an embodiment, this can arise when sparsity constraints are applied to layers individually. In an embodiment, although each layer has only two effective filters to be remained, overall there are four filters which cannot be removed. In an embodiment, FIG. 2 illustrates a second architecture 206 in which two layers have aligned sparsity cross filters, and only two filters will be remained. In an embodiment, all connected layers that are to have the same indices of filters to be removable.

Figure 3:
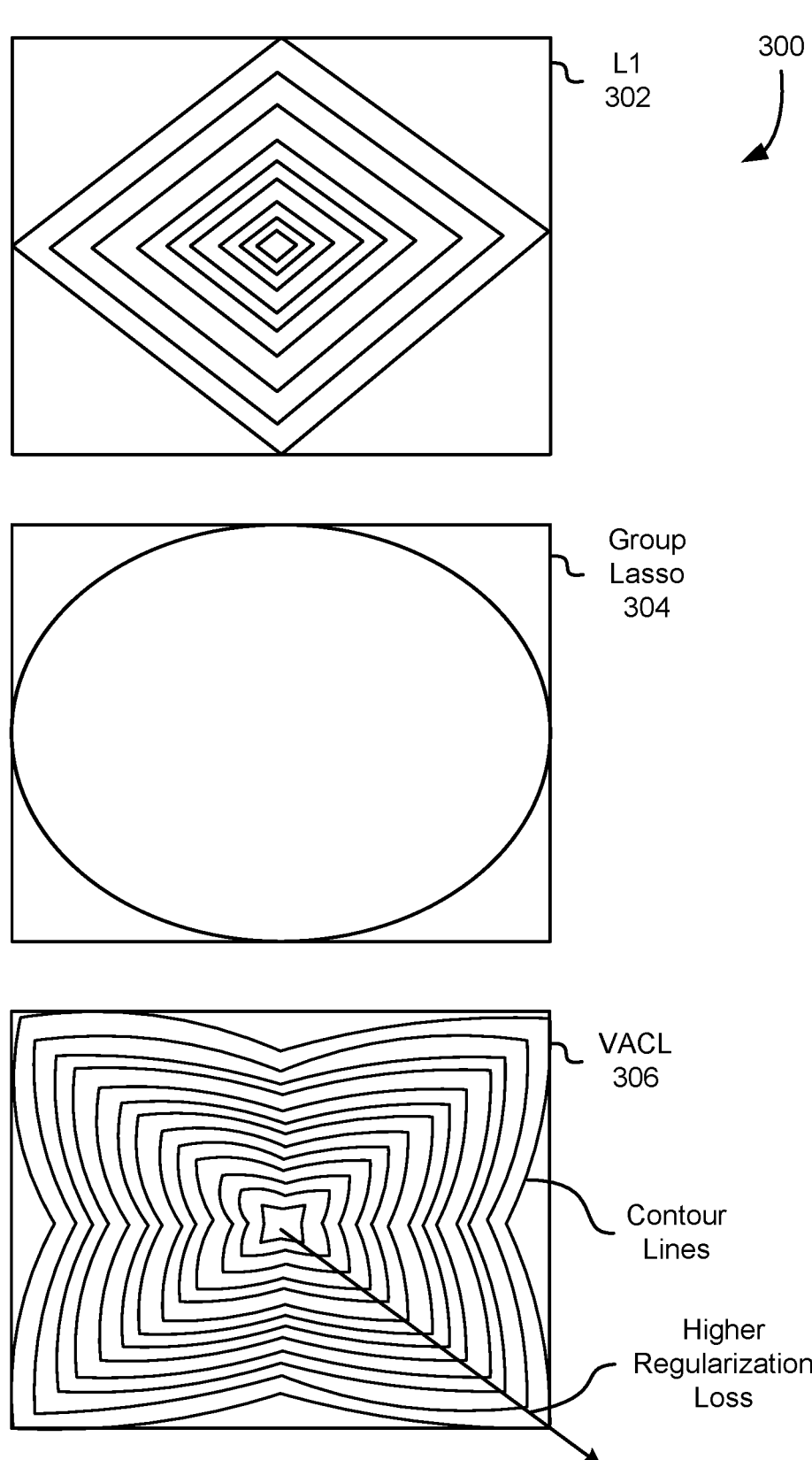
FIG. 3 illustrates regularization loss contours, in accordance with one embodiment.

In an embodiment, FIG. 3 illustrates a diagram 300 illustrating regularization loss contours among L1, group lasso, and VACL, in accordance with one embodiment. In an embodiment, the L1 regularization 302 encourages indi- vidual weights close to the four poles. In an embodiment, the group lass regularization 304 with x and y in the same group, the plot has smooth circle edges in expansion of the x-y plane, which is generated by the 2-norm of x and y. In an embodiment, the group lasso has $W=(w_1, w_2)$ in the same group. In an embodiment, the VACL regularization 306 is illustrated with x and y in the same group and with $W=(w_1, w_2)$ the same group and u the mean of $|w_1|$ and $|w_2|$. In an embodiment, VACL regularization has an item that regular- izes weight variances within each group and, as a result, the VACL contour has non-smooth edges composed of curves and four sharp angles. Each angle, in an embodiment, represents a direction in which the absolute value of x is equal to the absolute value of y, which means encouraging $|x|$ and $|y|$ to be equal. In an embodiment, VACL regular- ization is able to consistently remove filters from grouped layers across multiple runs, whereas L1 and cross layer group lasso (CLGL) either fail or cannot guarantee the filter removal for each run. In an embodiment, 2-norm of a weight filter is used as the criteria to determine whether a filter is to be removed or retained in the network. In an embodiment, a filter is removable if its 2-norm is below a threshold. In an embodiment, a filter connected by skip-connections is removable if and only if: (1) its 2-norm is below a threshold value (e.g., predetermined threshold); and (2) the 2-norm of all of the same indexed filters in multiple connected layers are below the threshold value simultaneously.

In an embodiment, a voting system is used to determine whether or not the i-th filter of every connected layer can be removed. In an embodiment, vote=1 denotes that the 2-norm of a filter is above the threshold in a certain layer. In an embodiment, votes for the i-th filter across all layers con- nected by element-wise operations (e.g., adding operations) are counted and if the count vote equals to exactly 0, then the i-th filter for all of those layers are removed. In an embodi- ment, if the vote count is not zero, then it is implied that the 2-norm of all of the same indexed filters in multiple con- nected layers are not below the threshold value simultane- ously and therefore that the i-th filter cannot be removed. In an embodiment, the vote count is normalized by the total number of connected layers and is used to determine a vote percentage. In an embodiment, a vote percentage equal to 1 means that none of the i-th filter across the grouped layers fulfills the requirement; vote percentage=0.5 means half of the i-th filter fulfills requirement 1, so that requirement (2) from the preceding paragraph is not fulfilled; vote percent- age=0 means all of the i-th filter fulfills requirement 1, so that requirement (2) of the preceding paragraph is also fulfilled.

In an embodiment, FIG. 4 illustrates a system 400 illus- trating an iterative training and pruning pipeline, in accor- dance with one embodiment. In an embodiment, an iterative includes a training stage and a pruning stage and incorpo- rates two hybrid regularization schemes: the first scheme 402 applies L1 and VACL alternatively across training stages (e.g., a first stage applies L1 and the next stage applies VACL, and so on), and the second scheme 404 applies VACL and LIS alternatively across training stages where LIS means applying L1 regularization to layers that are not connected by skip-connections. The training-pruning strat- egy improves pruning efficiency and demonstrates the gen- erality of VACL regularization methods.

In an embodiment, the first scheme 402 illustrates a pipeline algorithm that applies L1 regularization to all weights across all layers in a model (e.g., residual network) and then prunes the model. In an embodiment, after pruning, layers that are not connected by skip-connections are suc- cessfully pruned but layers connected by skip-connections are hardly pruned. In an embodiment, VACL regularization is then applied to the regularize filters in the connected layers and those layers are pruned. In an embodiment, this alternating regularization iterates until the model size and model accuracy are well balanced.

In an embodiment, the second scheme 404 illustrates a pipeline algorithm that first applies VACL to regularize weights in the connected layers, denoted as group layers, and prunes the network. In an embodiment, LIS regulariza- tion is applied on single layers and pruned. In an embodi- ment, single layers refer to layers that are not connected by skip-connections.

FIG. 5 shows an illustrative example of a process 500 to use weight information corresponding to a neural network, wherein weight information of at least a first one or more layers of the neural network is modified to compensate for deactivating one or more second layers of the neural network, in accordance with an embodiment. In an embodiment, some or all of the process 500 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in an embodiment, is stored on a computer-readable storage medium in the form of a computer program comprising a plurality of computer-readable instructions executable by one or more processors. The computer-readable storage medium, in an embodiment, is a non-transitory computer-readable medium. In an embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, the process 500 to use weight information corresponding to a neural network, wherein weight information of at least a first one or more layers of the neural network is modified to compensate for deactivating one or more second layers of the neural network is implemented or executed using or based on any suitable combination of computer circuitry, including but not limited to processors, arithmetic logic units (ALUs), integrated circuitry (e.g., application-specific integrated circuit), memory units, etc., in accordance with FIGS. 6-10, as described in greater detail herein above and below.

In an embodiment, the process includes grouping 502 filters across two or more layers of a neural network. In an embodiment, the neural network is a trained neural network where the weights of the neural network have, prior to the pruning process, been configured so that inputs to the neural network are used to generate outputs or predictions. In an embodiment, the neural network is a residual network such as a ResNet-based network. In an embodiment, the neural network includes ResNet blocks with convolutional layers connected by element-wise operations which are grouped by taking the i-th filter of each of the connected layers. In an embodiment, the system iterates through each of the filters (e.g., $1^{st}$, $2^{nd}$, $3^{rd}$ . . . $N^{th}$ of N filters) to prune the network and reduce how many parameters are in the network and improve test time performance. In an embodiment, grouping filters across two or more layers comprises determining that a first filter of a first layer and a second filter of a second layer (e.g., the i-th filter of both layers) are to be removed together (e.g., because the first filter and the second filter are connected by a skip-connection).

In an embodiment, the process includes performing 504 a regularization on the group to enforce aligned structure sparsity. In an embodiment, $$R^{vacl} = \sum_{g \in G} R_g^{vacl}$$

defines a VACL regularization where the first term of the VACL regularization calculates 2-norm of $w_k^g$, and the second term of the VACL regularization calculates the 2-norm of weights absolute difference of $w_k^g$ where the weights of the $k^{th}$ filter in layer group g are denoted as $$w_k g.$$

In an embodiment, the total cost of the model, as shown in the loss function $\mathcal{L}(X, W)$ described above is extended as:

$$\mathcal{L}(X, W) = \sum_{n=1}^{N} E[y_n, \mathcal{F}(x_n, W)] + \lambda R^{vacl}$$

$$= \sum_{n=1}^{N} E[y_n, \mathcal{F}(x_n, W)]$$

$$+ \lambda \left( \sum_{g \in G} \left\{ \sum_{k=1}^{K} \sqrt{p_k^g} \left[ \|w_k^g\|_2 \right. \right. \right.$$

$$\left. \left. \left. + \left\| \left( |w_k^g| - |\overline{w_k^g}| \right) \right\|_2 \right] \right\} \right)$$

In an embodiment, VACL regularization has an item that regularizes weight variance inside each group and is in accordance with techniques described elsewhere in this disclosure, including but not limited to those discussed in connection with FIG. 1.

In an embodiment, the process includes determining whether 506 the filter group is removable. In an embodiment, the system determines whether the filters are removable based on whether the result of the regularization satisfies a pruning criteria. In an embodiment, a filter in a layer connected by skip-connection with other layers is removable if and only if: (1) its 2-norm is below a threshold value (e.g., predetermined threshold); and (2) the 2-norm of all of the same indexed filters in multiple connected layers are below the threshold value simultaneously. If the system determines that the filter group is removable, the process includes simultaneously removing 508 the filters from all of the layers of the group, in accordance with one embodiment. In an embodiment, simultaneous removal refers to the atomic nature of the removal of the multiple filters as being an all-or-nothing operation (e.g., removal of some but not all of the filters in a group is disallowed) and not necessarily that the filters are concurrently removed at the same time. If the system determines that the filter group cannot be removed, the system keeps 510 the filters and, in an embodiment, continues to iterate through all of the filters to determine whether a different group of filters (e.g., for the i+1-th index) can be pruned.

Figure 6A:
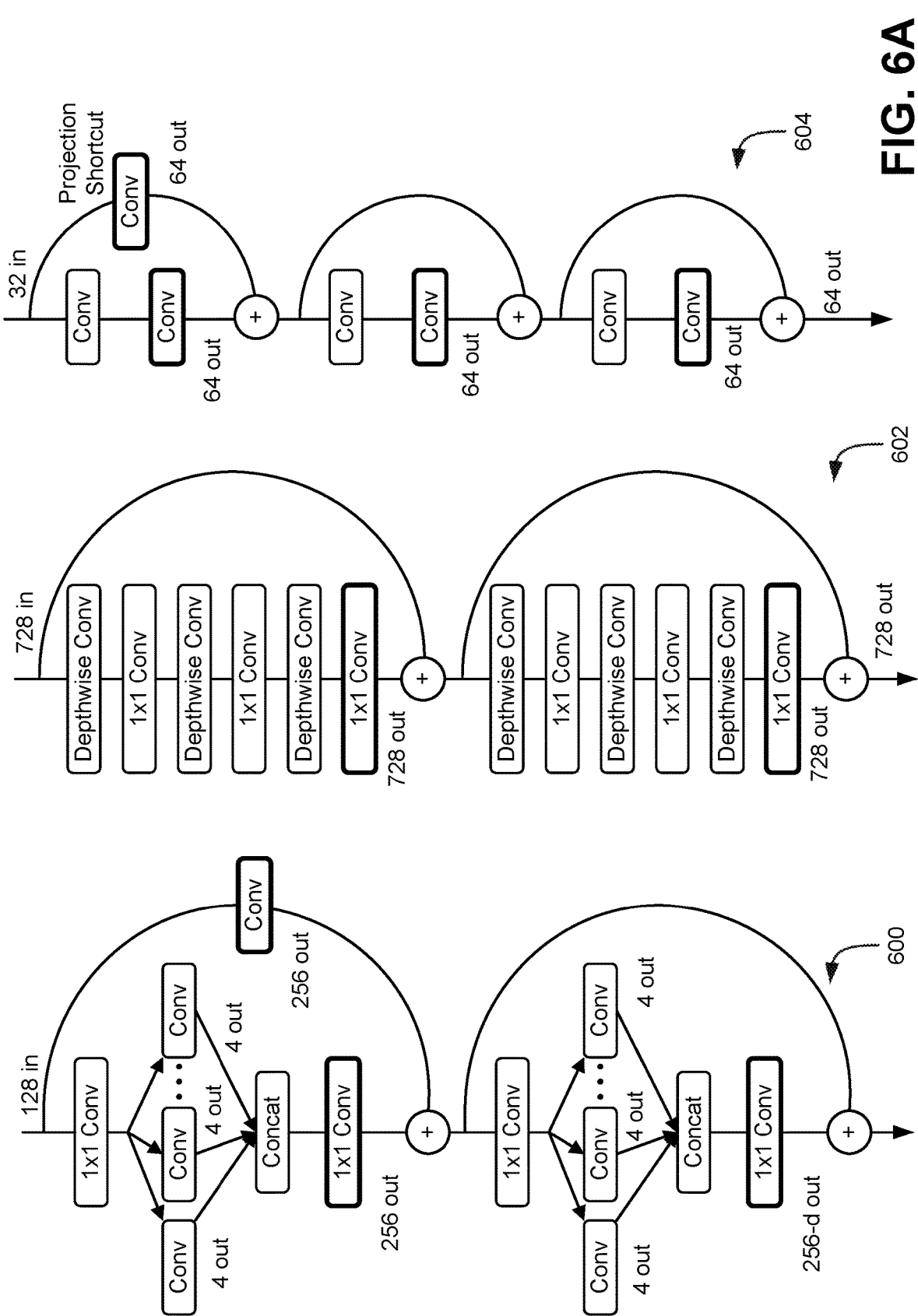
FIG. 6A illustrates one or more neural networks to implement variance aware cross layer regularization, in accordance with one embodiment.

FIG. 6A illustrates layer groups implemented according to different deep neural networks 600, 602, and 604, in accordance with one embodiment. In an embodiment, FIG. 6A illustrates respective portions of different neural network architectures connected by skip-connections. In an embodiment, most convolutional layers illustrated in FIG. 6A are located on the respective residual paths shown, except for a projection shortcut. In an embodiment, all layers within a network that are bolded have the same output shape $D_h \times D_w \times M$, where $D_h \times D_w$ is the size of the feature maps and M is the number of feature maps. In an embodiment, these layers are element-wise connected and for a layer group denoted by L. It should be noted that the neural networks illustrated in FIG. 6A, in an embodiment, are implemented separately and without a loss of generality, that the dimension of the bolded layers in one neural network (e.g., numeral 600) and another neural network (e.g., numeral 602) do not necessarily have the same dimensions. In an embodiment, numeral 600 illustrates a neural network according to one or more variations of ResNeXt. In an embodiment, numeral 602 illustrates a neural network according to one or more variations of Xception. In an embodiment, numeral 604 illustrates a neural network according to one or more variations of ResNet. In an embodiment, for a convolutional layer that generates M output feature maps, there are M filters, each having C×K×K weighs, where C is the number of input feature maps, and K×K is the filter size.

Figure 6B:
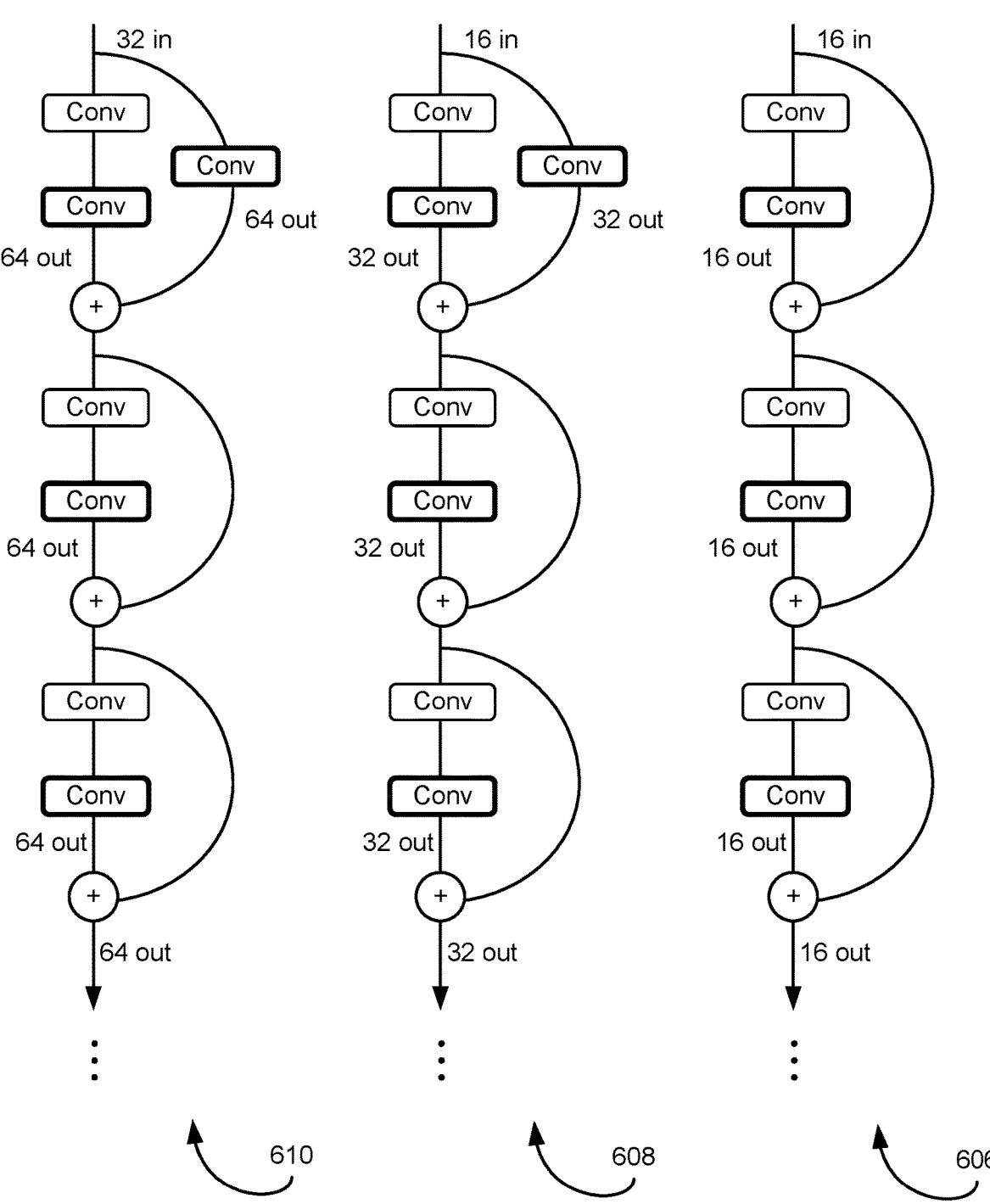
FIG. 6B illustrates one or more neural networks to implement variance aware cross layer regularization, in accordance with one embodiment.

In an embodiment, FIG. 6B illustrates three layer groups in a neural network (e.g., according to ResNet 110 or variations thereof) for CIFAR10. In an embodiment, the bolded blocks in a first block 606 form a first layer group L1, the bolded blocks in the second block 608 form a second layer group L2, and the bolded blocks in the third block 610 form a third layer group L2. In an embodiment, the feature maps generated by weights from the same indexed filter are aggregated to one output feature map. In an embodiment, when a feature map is redundant, filters used to generate it can be removed—based on the idea of Group Lasso regularization, a weight group $W_i$ can be defined as: $W_i=\cup W_{li}$ with i∈[1, M], l the index of a layer in L, and $w_{li}$ the weights of filter i in layer l. In an embodiment, by defining such weight groups, structural sparsity constraints such as Group Lasso can be applied to enforce group level sparsity so that the i-th filters of all layers in L are either significant or redundant.

Figure 7:
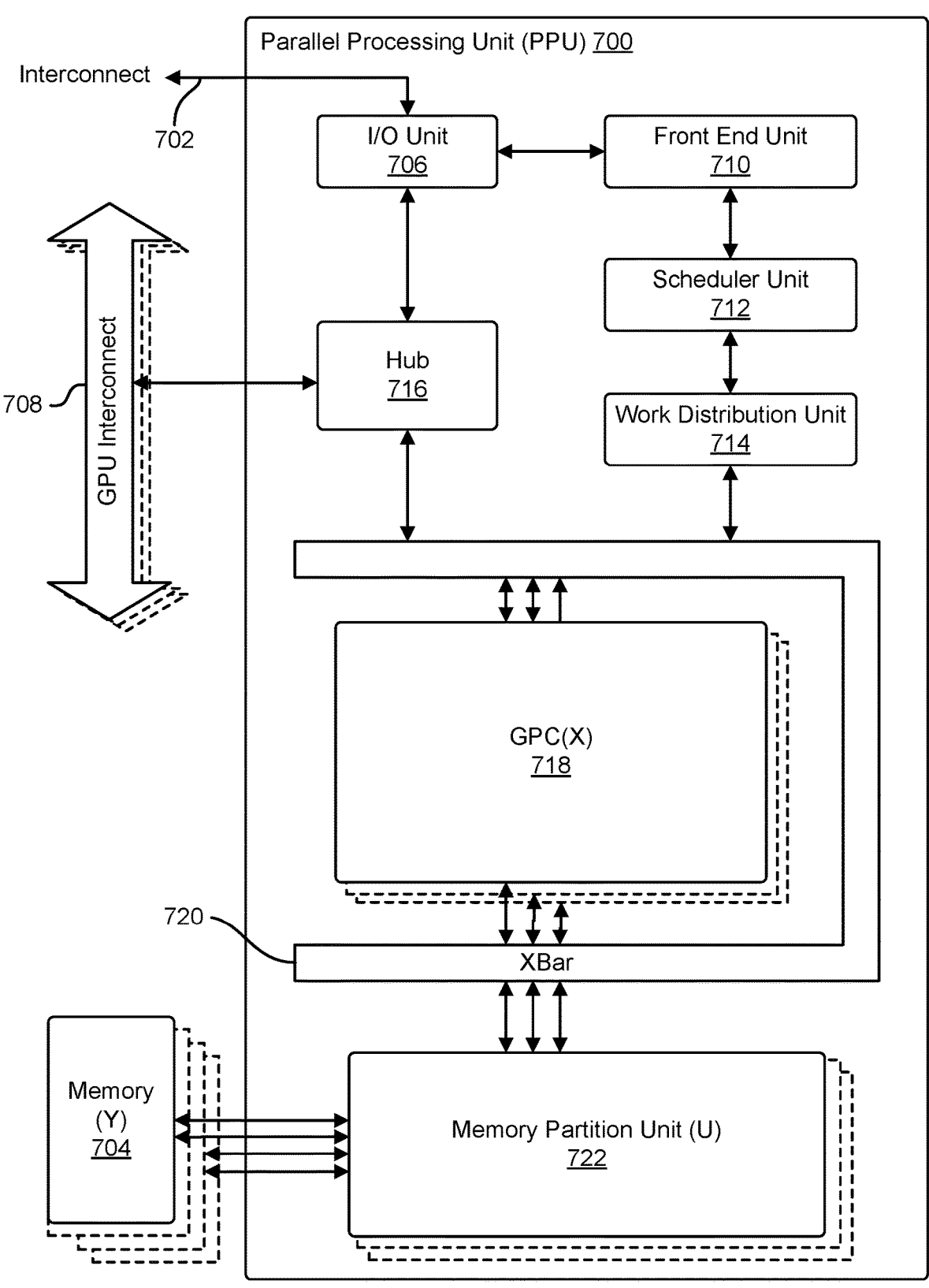
FIG. 7 illustrates an example of parallel processing unit ("PPU"), in accordance with an embodiment.

FIG. 7 illustrates a parallel processing unit ("PPU") 700, in accordance with one embodiment. In an embodiment, the PPU 700 is configured with machine-readable code that, if executed by the PPU, causes the PPU to perform some or all of processes and techniques described throughout this disclosure. In an embodiment, the PPU 700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 700. In an embodiment, the PPU 700 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 700 is utilized to perform computations such as linear algebra operations and machine-learning operations. FIG. 7 illustrates an example parallel processor for illustrative purposes only and should be construed as a non-limiting example of processor architectures contemplated within the scope of this disclosure and that any suitable processor may be employed to supplement and/or substitute for the same.

In an embodiment, the PPU 700 comprises one or more arithmetic logic units (ALUs) configured to use weight information corresponding to a neural network, wherein weight information of at least a first one or more layers of the neural network is modified to compensate for deactivating one or more second layers of the neural network. In an embodiment, the PPU 700 is configured to group a set of filters based on alignment of the set of filters across two or more layers of a neural network; perform a regularization on the set of filters to enforce aligned structure sparsity across the two or more layers; determine, as a result of the regularization, whether the set of filters satisfy a pruning criteria; and remove the set of filters from the neural network. In an embodiment, the PPU 700 is further configured to determine that removal of the set of filters from the neural network does not affect the quality of predictions generated by the network (e.g., by validating it against a canonical training set and determining whether the accuracy of the model was affect and/or by how much). In an embodiment, the PPU 700 is further configured to validate that the quality of the neural network was substantially unaffected by removal of the set of layers by validating that the predication quality of the neural network did not decrease beyond a predetermined threshold.

In an embodiment, one or more PPUs are configured to accelerate High Performance Computing ("HPC"), data center, and machine learning applications. In an embodiment, the PPU 700 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 700 includes an Input/Output ("I/O") unit 706, a front-end unit 710, a scheduler unit 712, a work distribution unit 714, a hub 716, a crossbar ("Xbar") 720, one or more general processing clusters ("GPCs") 718, and one or more memory partition units 722. In an embodiment, the PPU 700 is connected to a host processor or other PPUs 700 via one or more high-speed GPU interconnects 708. In an embodiment, the PPU 700 is connected to a host processor or other peripheral devices via an interconnect 702. In an embodiment, the PPU 700 is connected to a local memory comprising one or more memory devices 704. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 708 may refer to a wire-based multi-lane communications link that is used by systems to scale and include one or more PPUs 700 combined with one or more CPUs, supports cache coherence between the PPUs 700 and CPUs, and CPU mastering. In an embodiment, data and/or commands are transmitted by the high-speed GPU interconnect 708 through the hub 716 to/from other units of the PPU 700 such as one or more copy engines, video encoders, video decoders, power management units, and other components which may not be explicitly illustrated in FIG. 7.

In an embodiment, the I/O unit 706 is configured to transmit and receive communications (e.g., commands, data) from a host processor (not illustrated in FIG. 7) over the system bus 702. In an embodiment, the I/O unit 706 communicates with the host processor directly via the system bus 702 or through one or more intermediate devices such as a memory bridge. In an embodiment, the I/O unit 706 may communicate with one or more other processors, such as one or more of the PPUs 700 via the system bus 702. In an embodiment, the I/O unit 706 implements a Peripheral Component Interconnect Express ("PCIe") interface for communications over a PCIe bus. In an embodiment, the I/O unit 706 implements interfaces for communicating with external devices.

In an embodiment, the I/O unit 706 decodes packets received via the system bus 702. In an embodiment, at least some packets represent commands configured to cause the PPU 700 to perform various operations. In an embodiment, the I/O unit 706 transmits the decoded commands to various other units of the PPU 700 as specified by the commands. In an embodiment, commands are transmitted to the front-end unit 710 and/or transmitted to the hub 716 or other units of the PPU 700 such as one or more copy engines, a video encoder, a video decoder, a power management unit, etc. (not explicitly illustrated in FIG. 7). In an embodiment, the I/O unit 706 is configured to route communications between and among the various logical units of the PPU 700.

In an embodiment, a program executed by the host processor encodes a command stream in a buffer that provides workloads to the PPU 700 for processing. In an embodiment, a workload comprises instructions and data to be processed by those instructions. In an embodiment, the buffer is a region in a memory that is accessible (e.g., read/write) by both the host processor and the PPU 700—the host interface unit may be configured to access the buffer in a system memory connected to the system bus 702 via memory requests transmitted over the system bus 702 by the I/O unit 706. In an embodiment, the host processor writes the command stream to the buffer and then transmits a pointer to the start of the command stream to the PPU 700 such that the front-end unit 710 receives pointers to one or more command streams and manages the one or more streams, reading commands from the streams and forwarding commands to the various units of the PPU 700.

In an embodiment, the front-end unit 710 is coupled to a scheduler unit 712 that configures the various GPCs 718 to process tasks defined by the one or more streams. In an embodiment, the scheduler unit 712 is configured to track state information related to the various tasks managed by the scheduler unit 712 where the state information may indicate which GPC 718 a task is assigned to, whether the task is active or inactive, a priority level associated with the task, and so forth. In an embodiment, the scheduler unit 712 manages the execution of a plurality of tasks on the one or more GPCs 718.

In an embodiment, the scheduler unit 712 is coupled to a work distribution unit 714 that is configured to dispatch tasks for execution on the GPCs 718. In an embodiment, the work distribution unit 714 tracks a number of scheduled tasks received from the scheduler unit 712 and the work distribution unit 714 manages a pending task pool and an active task pool for each of the GPCs 718. In an embodiment, the pending task pool comprises a number of slots (e.g., 32 slots) that contain tasks assigned to be processed by a particular GPC 718; the active task pool may comprise a number of slots (e.g., 4 slots) for tasks that are actively being processed by the GPCs 718 such that as a GPC 718 completes the execution of a task, that task is evicted from the active task pool for the GPC 718 and one of the other tasks from the pending task pool is selected and scheduled for execution on the GPC 718. In an embodiment, if an active task is idle on the GPC 718, such as while waiting for a data dependency to be resolved, then the active task is evicted from the GPC 718 and returned to the pending task pool while another task in the pending task pool is selected and scheduled for execution on the GPC 718.

In an embodiment, the work distribution unit 714 communicates with the one or more GPCs 718 via XBar 720. In an embodiment, the XBar 720 is an interconnect network that couples many of the units of the PPU 700 to other units of the PPU 700 and can be configured to couple the work distribution unit 714 to a particular GPC 718. Although not shown explicitly, one or more other units of the PPU 700 may also be connected to the XBar 720 via the hub 716.

The tasks are managed by the scheduler unit 712 and dispatched to a GPC 718 by the work distribution unit 714. The GPC 718 is configured to process the task and generate results. The results may be consumed by other tasks within the GPC 718, routed to a different GPC 718 via the XBar 720, or stored in the memory 704. The results can be written to the memory 704 via the memory partition units 722, which implement a memory interface for reading and writing data to/from the memory 704. The results can be transmitted to another PPU or CPU via the high-speed GPU interconnect 708. In an embodiment, the PPU 700 includes a number U of memory partition units 722 that is equal to the number of separate and distinct memory devices 704 coupled to the PPU 700. A memory partition unit 722 will be described in more detail below in conjunction with FIG. 9.

In an embodiment, a host processor executes a driver kernel that implements an application programming interface ("API") that enables one or more applications executing on the host processor to schedule operations for execution on the PPU 700. In an embodiment, multiple compute applications are simultaneously executed by the PPU 700 and the PPU 700 provides isolation, quality of service ("QoS"), and independent address spaces for the multiple compute applications. In an embodiment, an application generates instructions (e.g., in the form of API calls) that cause the driver kernel to generate one or more tasks for execution by the PPU 700 and the driver kernel outputs tasks to one or more streams being processed by the PPU 700. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 9.

Figure 8:
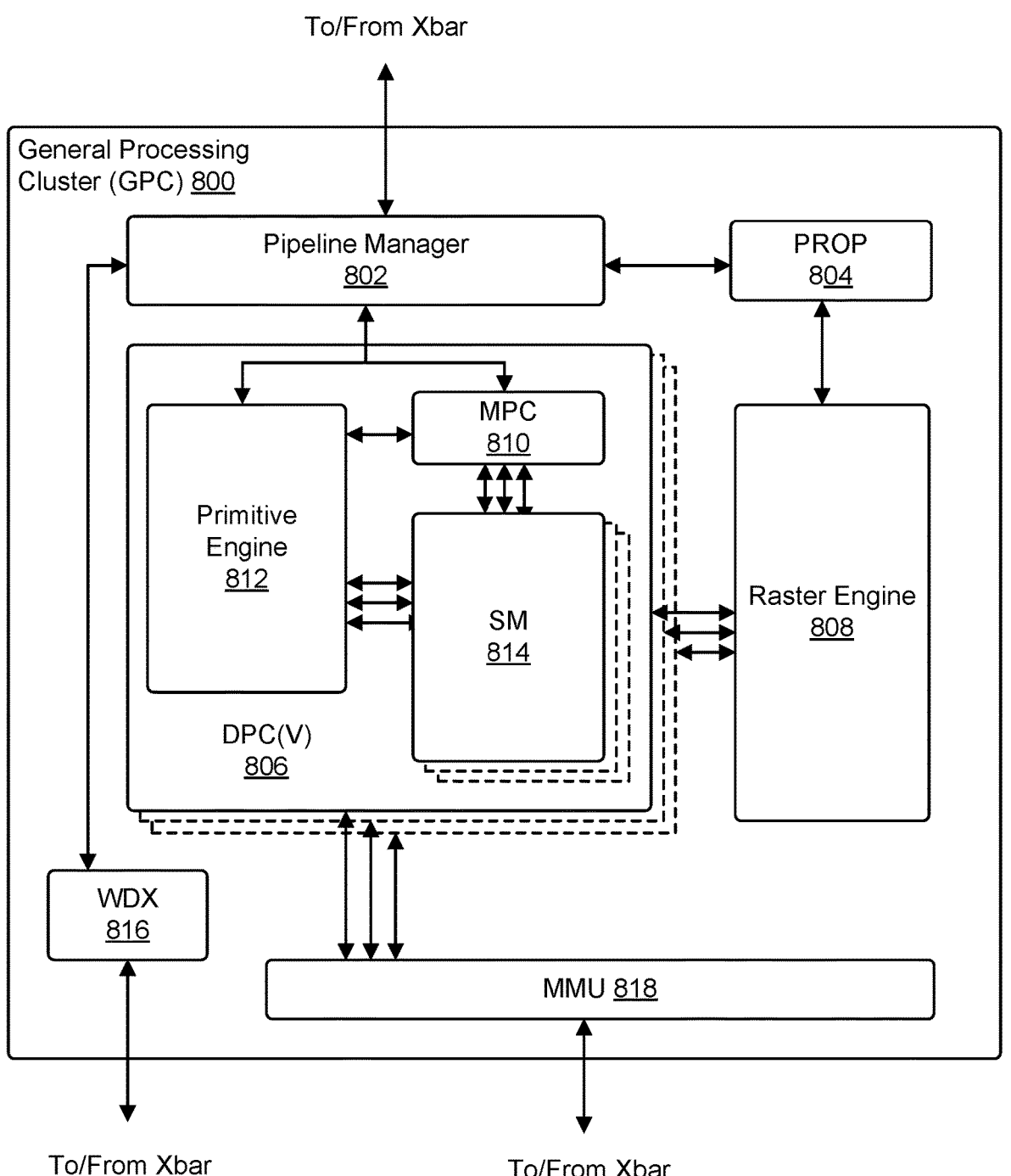
FIG. 8 illustrates an example of a general processing cluster ("GPC"), in accordance with one embodiment.

FIG. 8 illustrates a GPC 800 such as the GPC illustrated of the PPU 700 of FIG. 7, in accordance with one embodiment. In an embodiment, each GPC 800 includes a number of hardware units for processing tasks and each GPC 800 includes a pipeline manager 802, a pre-raster operations unit ("PROP") 804, a raster engine 808, a work distribution crossbar ("WDX") 816, a memory management unit ("MMU") 818, one or more Data Processing Clusters ("DPCs") 806, and any suitable combination of parts. It will be appreciated that the GPC 800 of FIG. 8 may include other hardware units in lieu of or in addition to the units shown in FIG. 8.

In an embodiment, the operation of the GPC 800 is controlled by the pipeline manager 802. The pipeline manager 802 manages the configuration of the one or more DPCs 806 for processing tasks allocated to the GPC 800. In an embodiment, the pipeline manager 802 configures at least one of the one or more DPCs 806 to implement at least a portion of a graphics rendering pipeline. In an embodiment, a DPC 806 is configured to execute a vertex shader program on the programmable streaming multiprocessor ("SM") 814. The pipeline manager 802 is configured to route packets received from a work distribution to the appropriate logical units within the GPC 800, in an embodiment, and some packets may be routed to fixed function hardware units in the PROP 804 and/or raster engine 808 while other packets may be routed to the DPCs 806 for processing by the primitive engine 812 or the SM 814. In an embodiment, the pipeline manager 802 configures at least one of the one or more DPCs 806 to implement a neural network model and/or a computing pipeline.

The PROP unit 804 is configured, in an embodiment, to route data generated by the raster engine 808 and the DPCs 806 to a Raster Operations ("ROP") unit in the memory partition unit, described in more detail above. In an embodiment, the PROP unit 804 is configured to perform optimizations for color blending, organize pixel data, perform address translations, and more. The raster engine 808 includes a number of fixed function hardware units configured to perform various raster operations, in an embodiment, and the raster engine 808 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 808 comprises fragments to be processed by any suitable entity such as by a fragment shader implemented within a DPC 806.

In an embodiment, each DPC 806 included in the GPC 800 comprises an M-Pipe Controller ("MPC") 810; a primitive engine 812; one or more SMs 814; and any suitable combination thereof. In an embodiment, the MPC 810 controls the operation of the DPC 806, routing packets received from the pipeline manager 802 to the appropriate units in the DPC 806. In an embodiment, packets associated with a vertex are routed to the primitive engine 812, which is configured to fetch vertex attributes associated with the vertex from memory; in contrast, packets associated with a shader program may be transmitted to the SM 814.

In an embodiment, the SM 814 comprises a programmable streaming processor that is configured to process tasks represented by a number of threads. In an embodiment, the SM 814 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 814 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 814 is described in more detail below.

In an embodiment, the MMU 818 provides an interface between the GPC 800 and the memory partition unit and the MMU 818 provides translation of virtual addresses into physical addresses, memory protection, and arbitration of memory requests. In an embodiment, the MMU 818 provides one or more translation lookaside buffers ("TLBs") for performing translation of virtual addresses into physical addresses in memory.

Figure 9:
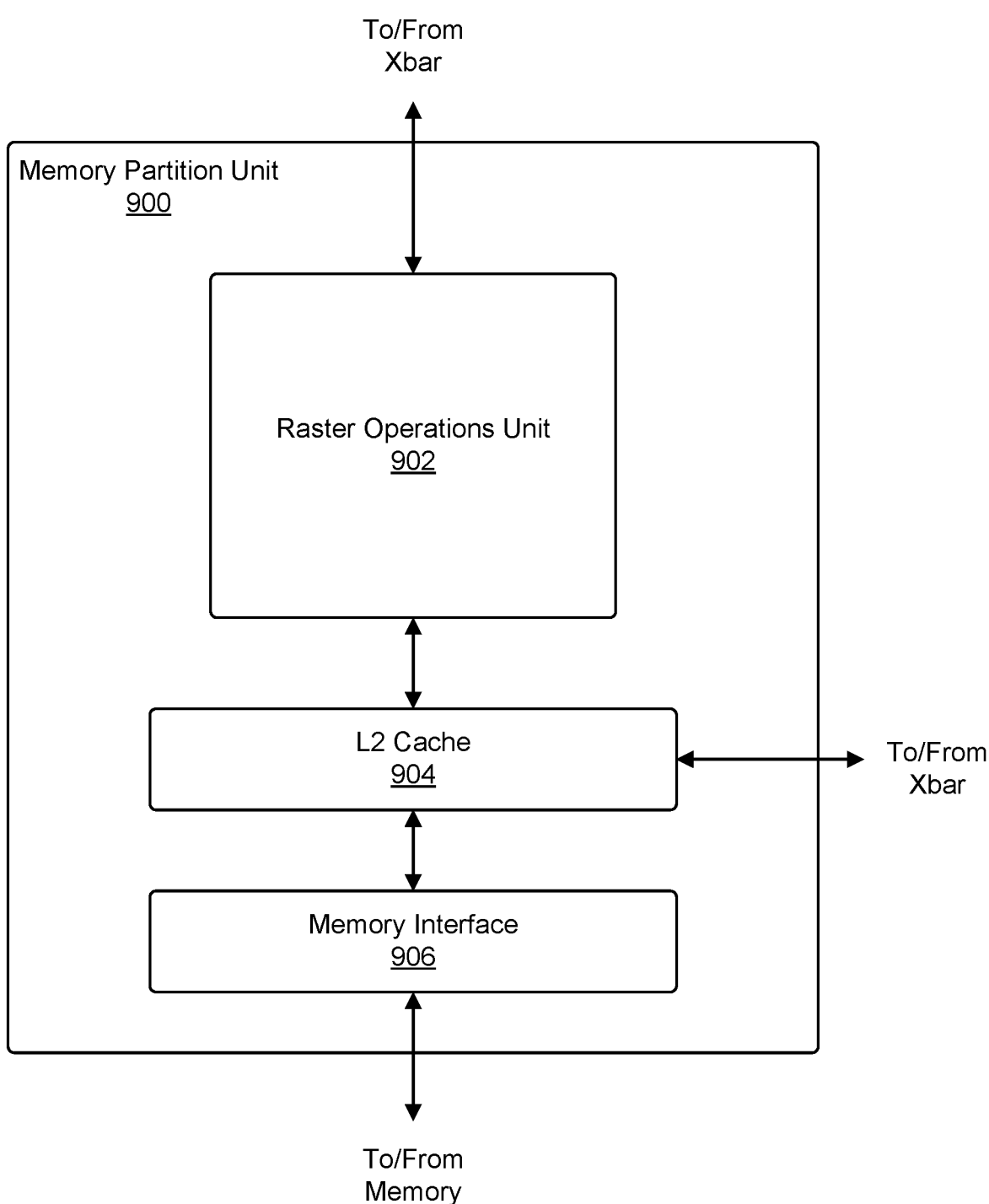
FIG. 9 illustrates an example of a memory partition unit, in accordance with one embodiment.

FIG. 9 illustrates a memory partition unit of a PPU, in accordance with one embodiment. In an embodiment, the memory partition unit 900 includes a Raster Operations ("ROP") unit 902; a level two ("L2") cache 904; a memory interface 906; and any suitable combination thereof. The memory interface 906 is coupled to the memory. Memory interface 906 may implement 32, 64, 128, 1124-bit data buses, or the like, for high-speed data transfer. In an embodiment, the PPU incorporates U memory interfaces 906, one memory interface 906 per pair of partition units 900, where each pair of partition units 900 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 906 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1124 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 900 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 708 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 900 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 7 or other system memory is fetched by the memory partition unit 900 and stored in the L2 cache 904, which is located on-chip and is shared between the various GPCs, in accordance with one embodiment. Each memory partition unit 900, in an embodiment, includes at least a portion of the L2 cache 770 associated with a corresponding memory device. In an embodiment, lower level caches are implemented in various units within the GPCs. In an embodiment, each of the SMs 840 may implement a level one ("L1") cache wherein the L1 cache is private memory that is dedicated to a particular SM 840 and data from the L2 cache 904 is fetched and stored in each of the L1 caches for processing in the functional units of the SMs 840. In an embodiment, the L2 cache 904 is coupled to the memory interface 906 and the XBar 720.

The ROP unit 902 performs graphics raster operations related to pixel color, such as color compression, pixel blending, and more, in an embodiment. The ROP unit 902, in an embodiment, implements depth testing in conjunction with the raster engine, receiving a depth for a sample location associated with a pixel fragment from the culling engine of the raster engine. In an embodiment, the depth is tested against a corresponding depth in a depth buffer for a sample location associated with the fragment. In an embodiment, if the fragment passes the depth test for the sample location, then the ROP unit 902 updates the depth buffer and transmits a result of the depth test to the raster engine. It will be appreciated that the number of partition units 900 may be different than the number of GPCs and, therefore, each ROP unit 902 can, in an embodiment, be coupled to each of the GPCs. In an embodiment, the ROP unit 902 tracks packets received from the different GPCs and determines which that a result generated by the ROP unit 902 is routed to through the Xbar.

Figure 10:
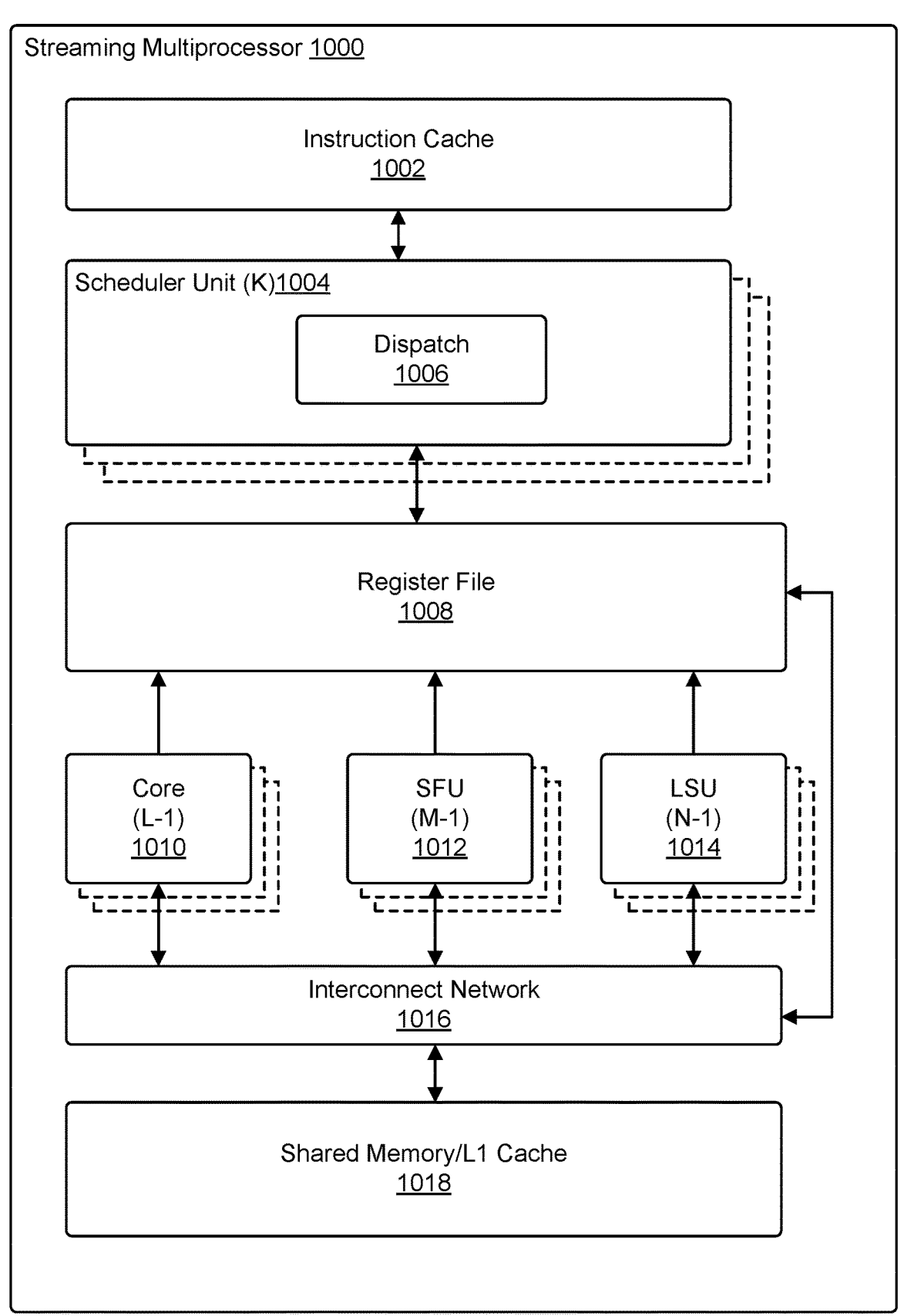
FIG. 10 illustrates an example of a streaming multiprocessor, in accordance with one embodiment.

FIG. 10 illustrates a streaming multi-processor such as the streaming multi-processor of FIG. 8, in accordance with one embodiment. In an embodiment, the SM 1000 includes: an instruction cache 1002; one or more scheduler units 1004; a register file 1008; one or more processing cores 1010; one or more special function units ("SFUs") 1012; one or more load/store units ("LSUs") 1014; an interconnect network 1016; a shared memory/L1 cache 1018; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1000. In an embodiment, the scheduler unit 1004 receives the tasks from the work distribution unit and manages instruction scheduling for one or more thread blocks assigned to the SM 1000. In an embodiment, the scheduler unit 1004 schedules thread blocks for execution as warps of parallel threads, wherein each thread block is allocated at least one warp. In an embodiment, each warp executes threads. In an embodiment, the scheduler unit 1004 manages a plurality of different thread blocks, allocating the warps to the different thread blocks and then dispatching instructions from the plurality of different cooperative groups to the various functional units (e.g., cores 1010, SFUs 1012, and LSUs 1014) during each clock cycle.

In an embodiment, the SM 1000 comprising one or more processors (e.g., the one or more processing cores 1010) and memory (e.g., implemented at least in part using the instruction cache 1002) that includes instructions which, if executed by the one or more processors, causes the SM 1000 to use weight information corresponding to a neural network, wherein weight information of at least a first one or more layers of the neural network is modified to compensate for deactivating one or more second layers of the neural network. In an embodiment, the SM 1000 is configured with computer-readable instructions which, as a result of execution, cause the SM 1000 identify a group of filters of two or more layers of a neural network that are to be removed together; applying a regularization to the group of filters to improve sparsity across the group of filters; determine that, as a result of applying the regularization, that the group of filters is sufficiently sparse to be removed; and remove the group of filters from the neural network. In an embodiment, the weights of the neural network are re-organized according to a group lasso regularization such that quality (e.g., accuracy) of the neural network is substantially unaffected by the removal of the group of filters, as the weights of the group of filters are small enough that they do not affect or do not meaningfully affect predictions of the neural network. In an embodiment, the SM 1000 determines that a first filter is to be removed along with a second filter because both filters are share a common index placement (e.g., both are the i-th filter of two layers that are connected by element-wise operations and are to be removed simultaneously).

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1006 is configured to transmit instructions to one or more of the functional units and the scheduler unit 1004 includes two dispatch units 1006 that enable two different instructions from the same warp to be dispatched during each clock cycle. In an embodiment, each scheduler unit 1004 includes a single dispatch unit 1006 or additional dispatch units 1006.

Each SM 1000, in an embodiment, includes a register file 1008 that provides a set of registers for the functional units of the SM 1000. In an embodiment, the register file 1008 is divided between each of the functional units such that each functional unit is allocated a dedicated portion of the register file 1008. In an embodiment, the register file 1008 is divided between the different warps being executed by the SM 1000 and the register file 1008 provides temporary storage for operands connected to the data paths of the functional units. In an embodiment, each SM 1000 comprises a plurality of L processing cores 1010. In an embodiment, the SM 1000 includes a large number (e.g., 128 or more) of distinct processing cores 1010. Each core 1010, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1010 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1010. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1000 comprises M SFUs 1012 that perform special functions (e.g., attribute evaluation, reciprocal square root, and the like). In an embodiment, the SFUs 1012 include a tree traversal unit configured to traverse a hierarchical tree data structure. In an embodiment, the SFUs 1012 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1000. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1000 includes two texture units.

Each SM 1000 comprises N LSUs 854 that implement load and store operations between the shared memory/L1 cache 906 and the register file 1008, in an embodiment. Each SM 1000 includes an interconnect network 1016 that connects each of the functional units to the register file 1008 and the LSU 1014 to the register file 1008, shared memory/L1 cache 1018 in an embodiment. In an embodiment, the interconnect network 1016 is a crossbar that can be configured to connect any of the functional units to any of the registers in the register file 1008 and connect the LSUs 1014 to the register file and memory locations in shared memory/ L1 cache 1018.

The shared memory/L1 cache 1018 is an array of on-chip memory that allows for data storage and communication between the SM 1000 and the primitive engine and between threads in the SM 1000 in an embodiment. In an embodiment, the shared memory/L1 cache 1018 comprises 128 KB of storage capacity and is in the path from the SM 1000 to the partition unit. The shared memory/L1 cache 1018, in an embodiment, is used to cache reads and writes. One or more of the shared memory/L1 cache 1018, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1018 enables the shared memory/L1 cache 1018 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1000 to execute the program and perform calculations, shared memory/L1 cache 1018 to communicate between threads, and the LSU 1014 to read and write global memory through the shared memory/L1 cache 1018 and the memory partition unit, in accordance with one embodiment. In an embodiment, when configured for general purpose parallel computation, the SM 1000 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 11:
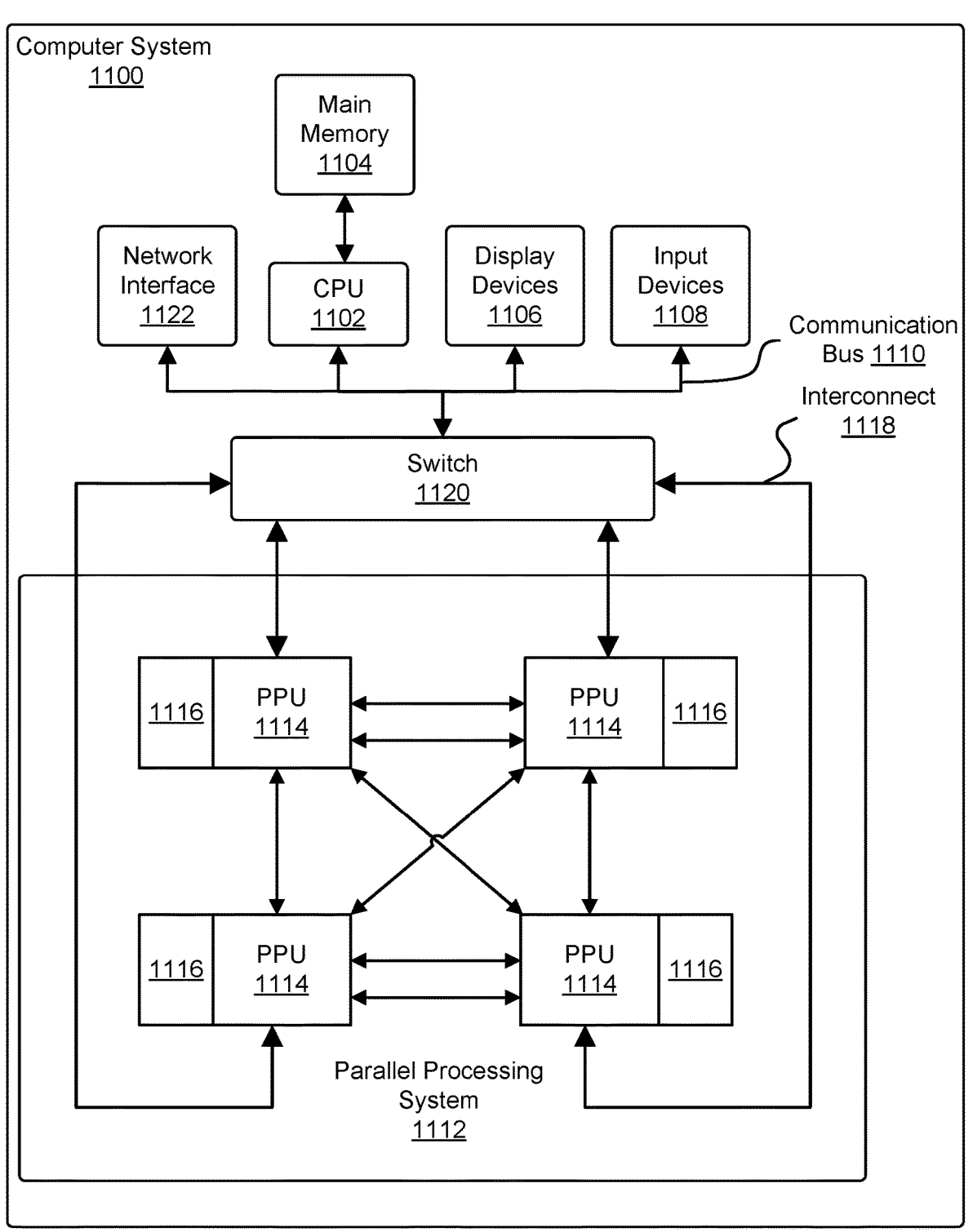
FIG. 11 illustrates a computer system in which the various examples can be implemented, in accordance with one embodiment.

FIG. 11 illustrates a computer system 1100 in which the various architecture and/or functionality can be implemented, in accordance with one embodiment. The computer system 1100, in an embodiment, is configured to implement various processes and methods described throughout this disclosure.

In an embodiment, the computer system 1100 comprises at least one central processing unit 1102 that is connected to a communication bus 1110 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1100 includes a main memory 1104 and control logic (e.g., implemented as hardware, software, or a combination thereof) and data are stored in the main memory 1104 which may take the form of random access memory ("RAM"). In an embodiment, a network interface subsystem 1122 provides an interface to other computing devices and networks for receiving data from and transmitting data to other systems from the computer system 1100.

The computer system 1100, in an embodiment, includes input devices 1108, the parallel processing system 1112, and display devices 1106 which can be implemented using a conventional CRT (cathode ray tube), LCD (liquid crystal display), LED (light emitting diode), plasma display, or other suitable display technologies. In an embodiment, user input is received from input devices 1108 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1104 and/or secondary storage. Computer programs, if executed by one or more processors, enable the system 1100 to perform various functions in accordance with one embodiment. The memory 1104, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1102; parallel processing system 1112; an integrated circuit capable of at least a portion of the capabilities of both the central processor 1102; the parallel processing system 1112; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1100 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1112 includes a plurality of PPUs 1114 and associated memories 1116. In an embodiment, the PPUs are connected to a host processor or other peripheral devices via an interconnect 1118 and a switch 1120 or multiplexer. In an embodiment, the parallel processing system 1112 distributes computational tasks across the PPUs 1114 which can be parallelizable—for example, as part of the distribution of computational tasks across multiple GPU thread blocks. In an embodiment, memory is shared and accessible (e.g., for read and/or write access) across some or all of the PPUs 1114, although such shared memory may incur performance penalties relative to the use of local memory and registers resident to a PPU. In an embodiment, the operation of the PPUs 1114 is synchronized through the use of a command such as _syncthreads( ) which requires all threads in a block (e.g., executed across multiple PPUs 1114) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. One or more processors, comprising:
circuitry to:
identify one or more filters of one or more first layers of a neural network that are to be removed from each of the one or more first layers;
perform a regularization on the one or more filters;
group a set of filters of the one or more filters based on alignment of the set of filters across two or more layers of the neural network;
align structure sparsity across the two or more layers based, at least in part, on the regularization on the one or more filters;
determine, as a result of the regularization, whether the set of filters satisfy a pruning criteria; and
deactivate one or more second layers of the neural network in response to determining the set of filters satisfies the pruning criteria by pruning the neural network to remove the set of filters from the neural network.

2. The one or more processors of claim 1, wherein the circuitry is to remove the one or more filters by at least:
applying the sparsity across the set of filters based, at least in part, on the regularization on the one or more filters; and
determining that, as a result of the regularization, the set of filters is sufficiently sparse to be removed.

3. The one or more processors of claim 2, wherein performing the regularization to enforce aligned structure sparsity across the two or more layers comprises penalizing variance of weights among the two or more layers.

4. The one or more processors of claim 1, wherein one or more second layers comprise two or more layers connected by skip-connections.

5. The one or more processors of claim 1, wherein the neural network comprising the one or more first layers and one or more second layers is a residual neural network.

6. The one or more processors of claim 1, wherein a first layer of the one or more first layers and a second layer of the one or more first layers are directly connected by an element-wise operator.

7. The one or more processors of claim 1, wherein, to perform inferencing using the neural network, the one or more second layers depend on the one or more first layers.

8. The one or more processors of claim 1, wherein, to perform inferencing using the neural network, the one or more first layers depends on the one or more second layers.

9. The one or more processors of claim 1, wherein deactivation of a set of filters comprises an effect on accuracy comparison generated based, at least in part, on the one or more first layers.

10. The one or more processors of claim 1, wherein the pruning criteria is associated with a threshold value.

11. The one or more processors of claim 1, wherein the circuitry is to compare one or more values of the one or more filters to a threshold.

12. The one or more processors of claim 1, wherein weights of the one or more first layers comprises one or more first filters that are modified to compensate removal of one or more second filters of the one or more second layers.

13. The one or more processors of claim 1, wherein deactivation of the set of filters comprises identifying a first accuracy after one or more first filters are deactivated, identifying a second accuracy after one or more second filters are deactivated, and determining which of the one or more first filters and the one or more second filters is to be removed based, at least in part, on the identification.

14. A system, comprising:
one or more computers comprising one or more processors to:
identify one or more filters of one or more first layers of a neural network that are to be removed from each of the one or more first layers;
perform a regularization on the one or more filters;
group a set of filters of the one or more filters based on alignment of the set of filters across two or more layers of the neural network;
align structure sparsity across the two or more layers based, at least in part, on the regularization on the one or more filters;
determine, as a result of the regularization, whether the set of filters satisfy a pruning criteria; and
deactivate one or more second layers of the neural network in response to determining the set of filters satisfies the pruning criteria by pruning the neural network to remove the set of filters from the neural network.

15. The system of claim 14, wherein the one or more processors remove the one or more filters by at least:

applying the sparsity across the set of filters based, at least in part, on the regularization on the one or more filters; and determining that, as a result of applying the regularization, that the set of filters is sufficiently sparse to be removed.

16. The system of claim 15, wherein applying the regularization to the set of filters comprises, for a filter of the set of filters:

calculating a norm for a weight group of the set of filters; and calculating a difference in weight values of the weight group.

17. The system of claim 16, wherein the determining that a first filter of the set of filters is to be removed with a second filter of the set of filters is based on a common index placement of the first filter and the second filter.

18. The system of claim 15, wherein the set of filters are from the one or more first layers that are connected by element-wise operators.

19. The system of claim 15, wherein determining that the set of filters is sufficiently sparse comprises comparing at least one norm of each filter of the set of filters with a threshold value.

20. The system of claim 15, wherein the one or more processors are further to prune the one or more second layers as a result of determining that the set of filters is sufficiently sparse to be removed.

21. A non-transitory machine-readable medium having stored thereon a set of instructions, which if performed by one or more processors, cause the one or more processors to at least:

identify one or more filters of one or more first layers of a neural network that are to be removed from each of the one or more first layers;

perform a regularization on the one or more filters;

group a set of filters of the one or more filters based on alignment of the set of filters across two or more layers of the neural network;

align structure sparsity across the two or more layers based, at least in part, on the regularization on the one or more filters;

determine, as a result of the regularization, whether the set of filters satisfy a pruning criteria; and deactivate one or more second layers of the neural network in response to determining the set of filters satisfies the pruning criteria by pruning the neural network to remove the set of filters from the neural network.

22. The non-transitory machine-readable medium of claim 21, wherein deactivation of a set of filters of the one or more second layers comprises removing the one or more second layers.

23. The non-transitory machine-readable medium of claim 21, wherein the one or more second layers are removed in response to the one or more second layers satisfying a pruning criteria.

24. The non-transitory machine-readable medium of claim 21, wherein the set of instructions, which if performed by the one or more processors, cause the one or more processors to adjust the one or more first layers based, at least in part, on aligning sparsity between the one or more second layers.

25. The non-transitory machine-readable medium of claim 21, wherein the neural network comprising the one or more first layers and one or more second layers comprise a ResNet block.

26. The non-transitory machine-readable medium of claim 21, wherein the one or more second layers are connected layers.

27. The non-transitory machine-readable medium of claim 21, wherein an accuracy of the neural network comprising the one or more first layers and one or more second layers is substantially unaffected by deactivation of the one or more second layers.

28. One or more processors, comprising:

circuitry to help train a neural network by at least:

identifying one or more filters of one or more first layers of the neural network that are to be removed from each of the one or more first layers;

performing a regularization on the one or more filters;

grouping a set of filters of the one or more filters based on alignment of the set of filters across two or more layers of the neural network;

aligning structure sparsity across the two or more layers based, at least in part, on the regularization on the one or more filters;

determining, as a result of the regularization, whether the set of filters satisfy a pruning criteria; and deactivating one or more second layers of the neural network in response to determining the set of filters satisfies the pruning criteria by pruning the neural network to remove the set of filters from the neural network.

29. The one or more processors of claim 28, wherein the circuitry is to adjust one or more weights of the neural network in order to reduce variation of weights in the one or more second layers of the neural network.

30. The one or more processors of claim 29, wherein adjusting the one or more weights of the neural network in order to reduce the variation of weights in the one or more second layers of the neural network comprises reducing at least one norm of the weights.

31. The one or more processors of claim 28, wherein the circuitry is to:

at a first stage of training, apply a 1-norm regularization on the neural network;

at a second stage of training, apply a regularization on a group of filters from a set of layers connected by element-wise operations; and as a result of performing the first stage and the second stage, pruning the neural network.

32. The one or more processors of claim 28, wherein the neural network is to be trained to detect objects in images.

33. The one or more processors of claim 28, wherein the neural network is a residual neural network.

34. A system, comprising:

one or more computers comprising one or more processors to help train a neural network by at least:

identifying one or more filters of one or more first layers of the neural network that are to be removed from each of the one or more first layers;

performing a regularization on the one or more filters;

grouping a set of filters of the one or more filters based on alignment of the set of filters across two or more layers of the neural network;

aligning structure sparsity across the two or more layers based, at least in part, on the regularization on the one or more filters;

determining, as a result of the regularization, whether the set of filters satisfy a pruning criteria; and deactivating one or more second layers of the neural network in response to determining the set of filters satisfies the pruning criteria by pruning the neural network to remove the set of filters from the neural network.

35. The system of claim 34, wherein the one or more processors are to train the neural network by at least:

at a first stage of training, apply a regularization on at least one set of a set of the one or more first layers or a set of one or more second layers connected by skip-connections;

at a second stage of training, applying a 1-norm regularization on layers of a different set of layers of the neural network from the at least one set of layers connected by skip-connections; and as a result of execution of a first layer and a second layer, pruning the neural network.

36. The system of claim 35, wherein the one or more processors to prune the neural network cause the neural network to remove two or more filters of the at least one set of layers connected by skip-connections.

37. The system of claim 36, wherein the two or more filters of the at least one of a set of the one or more first layers or a set of one or more second layers comprises a first filter and a second filter of the at least one of a set of the one or more first layers or a set of the one or more second layers at an index position.

38. The system of claim 35, wherein pruning the neural network generates a pruned neural network and the one or more processors are to further:

determine a baseline error rate of the neural network;

determine a pruned error rate of the pruned neural network; and determine whether a threshold error is exceeded based on the baseline error rate and the pruned error rate.

39. The system of claim 34, wherein the one or more processors to use weight comparison corresponding to the neural network are to at least:

apply the sparsity across the set of filters based, at least in part, on the regularization on the one or more filters; and determine that, as a result of the regularization, that the set of filters is sufficiently sparse to be removed.

40. The system of claim 34, wherein the system is an image recognition system, and the neural network is configured to obtain one or more images and, as a result of execution of the neural network, determine one or more classifications for the one or more images.

41. A non-transitory machine-readable medium having stored thereon a set of instructions, which if performed by one or more processors, cause the one or more processors to at least: help train a neural network by:

identifying one or more filters of one or more first layers of the neural network that are to be removed from each of the one or more first layers;

performing a regularization on the one or more filters;

grouping a set of filters of the one or more filters based on alignment of the set of filters across two or more layers of the neural network;

aligning structure sparsity across the two or more layers based, at least in part, on the regularization on the one or more filters;

determining, as a result of the regularization, whether the set of filters satisfy a pruning criteria; and deactivating one or more second layers of the neural network in response to determining the set of filters satisfies the pruning criteria by pruning the neural network to remove the set of filters from the neural network.

42. The non-transitory machine-readable medium of claim 41, wherein the set of instructions to train the neural network, if performed by the one or more processors, cause the one or more processors to perform deactivation of the set of filters of the one or more second layers by at least pruning the neural network.

43. The non-transitory machine-readable medium of claim 41, wherein the set of instructions, which if performed by the one or more processors, cause the one or more processors to perform deactivation of the set of filters of the one or more second layers based at least in part on aligning sparsity between the one or more second layers.

44. The non-transitory machine-readable medium of claim 41, wherein the neural network comprises a ResNet block.

45. The non-transitory machine-readable medium of claim 41, wherein one or more second layers are layers directly connected by skip-connections.

46. The non-transitory machine-readable medium of claim 41, wherein an accuracy of the neural network is substantially unaffected by deactivation of the one or more second layers.

* * * * *